(12) United States Patent
Horley et al.

(10) Patent No.: US 10,439,903 B2
(45) Date of Patent: Oct. 8, 2019

(54) GATHERING MONITORING DATA RELATING TO THE OPERATION OF A DATA PROCESSING SYSTEM

(71) Applicant: ARM LIMITED, Cambridge (GB)

(72) Inventors: John Michael Horley, Hauxton (GB); Christopher Vincent Severino, Haverhill (GB)

(73) Assignee: ARM Limited, Cambridge (GB)

( * ) Notice: Subject to any disclaimer, the term of this patent is extended or adjusted under 35 U.S.C. 154(b) by 251 days.

(21) Appl. No.: 15/191,950

(22) Filed: Jun. 24, 2016

(65) Prior Publication Data

US 2017/0026255 A1      Jan. 26, 2017

(30) Foreign Application Priority Data

Jul. 23, 2015   (GB) .................................. 1513032.1

(51) Int. Cl.
*H04L 12/26*       (2006.01)

(52) U.S. Cl.
CPC .............. *H04L 43/04* (2013.01); *H04L 43/12* (2013.01)

(58) Field of Classification Search
CPC ........ G06F 1/3287; G06F 1/26; G06F 1/3246; G06F 1/3203; G06F 1/266; G06F 1/32; G06F 1/3206; G06F 1/3215; G06F 1/325; G06F 1/3278; G06F 1/3296; G06F 1/3228; G06F 1/3234; G06F 1/3253; H04L 43/04; H04L 43/12; H02J 50/80; H04N 1/00891; H04N 1/00885; H04N 1/00896; H04N 1/00904; Y02D 10/171; B60W 30/1886; H04B 5/0031; H04B 5/0037; A61B 2560/0214

See application file for complete search history.

(56) References Cited

U.S. PATENT DOCUMENTS

| | | | |
|---|---|---|---|
| 2005/0015773 A1* | 1/2005 | Gorman | G06F 11/3495 719/310 |
| 2007/0078975 A1* | 4/2007 | LeMay | G01R 31/023 709/224 |
| 2009/0106595 A1* | 4/2009 | Sarig | G06F 11/0748 714/37 |

(Continued)

OTHER PUBLICATIONS

Combined Search and Examination Report for GB1513032.1 dated Feb. 19, 2016, 5 pages.

(Continued)

*Primary Examiner* — Sargon N Nano
(74) *Attorney, Agent, or Firm* — Nixon & Vanderhye P.C.

(57) ABSTRACT

A system, apparatus and method for gathering monitoring data relating to the operation of a data processing system are disclosed. The data processing system comprises a monitor controller and a plurality of monitors which gather monitoring data relating to the operation of the data processing system. Each monitor does not send its monitoring data to the monitor controller unsolicited, but merely indicates to the monitor controller that it has such data ready for transmission. In response to reception of a data ready signal from more than one monitor, the monitor controller selects one of these monitors and sends it a data transmission command, thereby avoiding resource contention in a shared resource between data transmissions from more than one monitor.

19 Claims, 6 Drawing Sheets

(56) References Cited

U.S. PATENT DOCUMENTS

| | | | | |
|---|---|---|---|---|
| 2010/0265413 | A1* | 10/2010 | Seo | H04N 5/4403 |
| | | | | 348/734 |
| 2011/0128898 | A1* | 6/2011 | Park | H04W 72/1263 |
| | | | | 370/311 |
| 2012/0166825 | A1* | 6/2012 | Blackburn | G06F 1/3203 |
| | | | | 713/310 |
| 2014/0089710 | A1* | 3/2014 | Yeh | H04W 52/0296 |
| | | | | 713/323 |
| 2014/0171063 | A1* | 6/2014 | Mori | H04W 52/241 |
| | | | | 455/424 |
| 2014/0354066 | A1* | 12/2014 | Watanabe | H02J 5/005 |
| | | | | 307/104 |
| 2016/0134129 | A1* | 5/2016 | Watanabe | H02M 1/32 |
| | | | | 307/104 |
| 2016/0352155 | A1* | 12/2016 | Iwasaki | H02J 7/025 |

OTHER PUBLICATIONS

[Online] "Multiple Access with Collision Avoidance for Wireless", Wikipedia article, Dec. 9, 2014, 4 pages.

* cited by examiner

GATHERING MONITORING DATA RELATING TO THE OPERATION OF A DATA PROCESSING SYSTEM

This application claims priority to GB Patent Application No. 1513032.1 filed 23 Jul. 2015, the entire content of which is hereby incorporated by reference.

TECHNICAL FIELD

The present disclosure relates to the field of data processing. More particularly it relates to the gathering of monitoring data from a plurality of monitors in a data processing system.

BACKGROUND

It may be desirable to gather data relating to the operation of a data processing system whilst it carries out its data processing operations, for example by counting certain events which may take place as a result of those data processing operations, such as cache misses, and periodically to inspect a counter value in order to correlate the count with program execution in order to better understand the relationship between executed software and system performance. This periodic inspection of a counter value may for example be carried out by taking an interrupt at intervals, or taking an interrupt after a predetermined number of events have occurred, and then reading the counter value.

SUMMARY

In at least some embodiments the present techniques provide a data processing system comprising a monitor controller; and a plurality of monitors to gather monitoring data relating to operation of the data processing system, wherein the monitor controller is responsive to data ready signals received from more than one monitor indicating that each has monitoring data ready for transmission to the monitor controller selectively to transmit a data transmission command to each of the more than one monitors to avoid resource contention in a shared resource between transmissions from each of the more than one monitors.

In at least some embodiments the present techniques provide a method of operating a data processing system comprising gathering monitoring data relating to operation of the data processing system using a plurality of monitors; transmitting data ready signals from more than one monitor of the plurality of monitors to a monitor controller indicating that each has monitoring data ready for transmission to the monitor controller; in response to the data ready signals received from the more than one monitor, selectively transmitting a data transmission command to each of the more than one monitors to avoid resource contention in a shared resource of the data processing system between transmissions from each of the more than one monitors.

In at least some embodiments the present techniques provide a data processing system comprising means for gathering monitoring data relating to operation of the data processing system; and means for transmitting data ready signals from more than one means for gathering monitoring data to means for controlling monitors indicating that each means for gathering monitoring data has monitoring data ready for transmission to the means for controlling monitors, wherein the means for controlling monitors is responsive to the data ready signals received from the more than one means for gathering monitoring data selectively to transmit a data transmission command to each of the more than one means for gathering monitoring data to avoid resource contention in a shared resource of the data processing system between transmissions from each of the more than one means for gathering monitoring data.

In at least some embodiments the present techniques provide a monitor controller to gather monitoring data from a plurality of monitors relating to operation of a data processing system, wherein the monitor controller is responsive to indications received from more than one monitor indicating that each has monitoring data ready for transmission to the monitor controller selectively to transmit a monitoring data transmission command to each of the more than one monitors to avoid resource contention between transmissions from each of the more than one monitors.

BRIEF DESCRIPTION OF DRAWINGS

The present techniques will be described further, by way of example only, with reference to embodiments thereof as illustrated in the accompanying drawings, in which.

DESCRIPTION OF EMBODIMENTS

Figure 1:
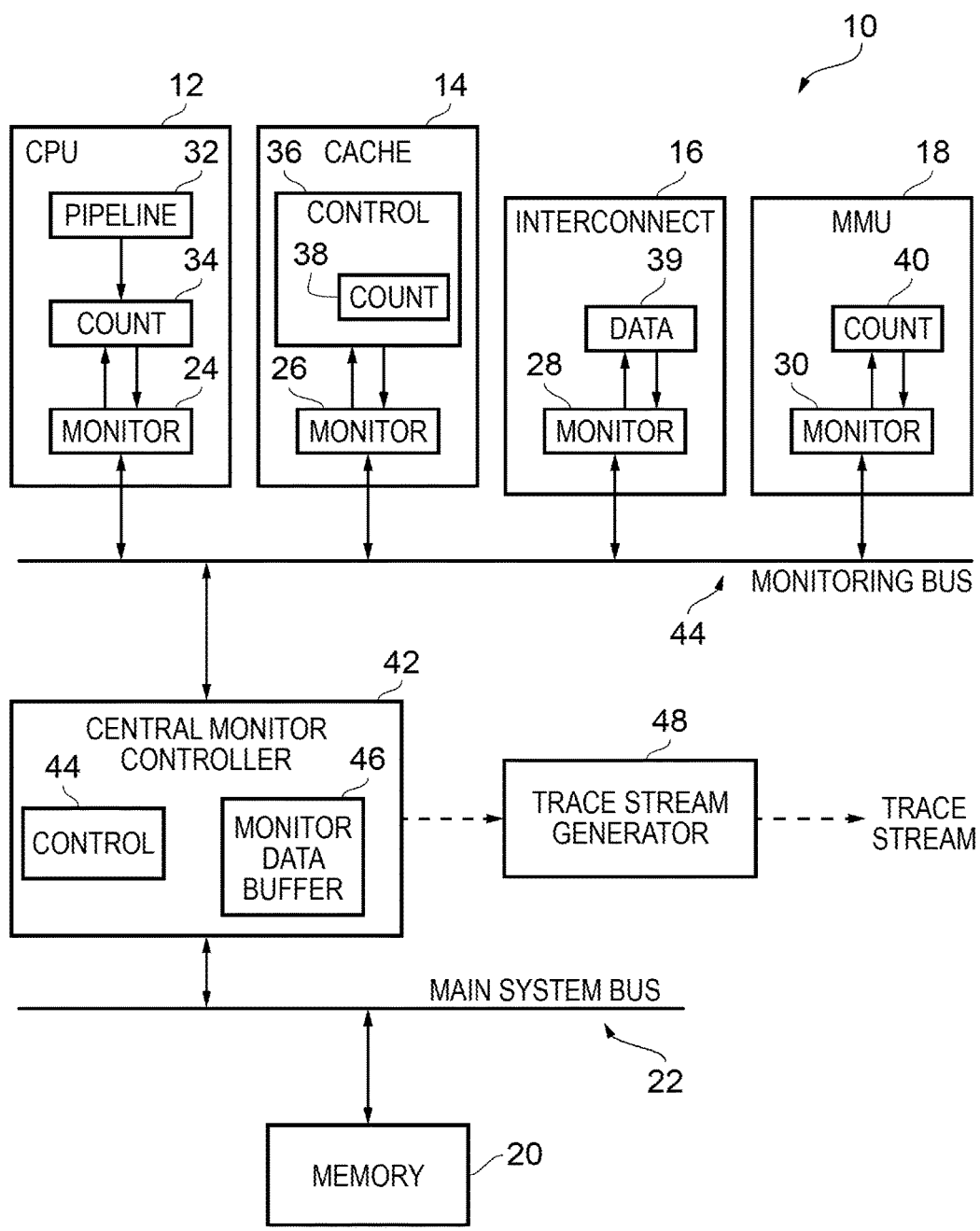
FIG. 1 schematically illustrates a data processing system in one embodiment.

At least some embodiments provide a data processing system comprising a monitor controller; and a plurality of monitors to gather monitoring data relating to operation of the data processing system, wherein the monitor controller is responsive to data ready signals received from more than one monitor indicating that each has monitoring data ready for transmission to the monitor controller selectively to transmit a data transmission command to each of the more than one monitors to avoid resource contention in a shared resource between transmissions from each of the more than one monitors.

In the data processing system the plurality of monitors can thus each individually gather monitoring data which may be of use to better understand the operation of the data processing system. This monitoring data could take a great variety of forms, relating to any aspect of the data processing operations carried out by the data processing system, but may for example comprise a count value maintained by a counter in at least one of the monitors which indicates how often a particular event monitored by that monitor has occurred. Each of the plurality of monitors can indicate to the monitor controller of the data processing system that it has such monitoring data which is ready for transmission to the monitor controller by transmitting a data ready signal to the monitor controller. In response to receiving these data ready signals from more than one monitor the monitor controller selectively transmits a data transmission command to each of those monitors. In other words, the monitor controller selects one of the monitors to receive that data transmission command and transmits the data transmission command to that selected monitor. Thereafter, following an appropriate interval (further discussed below), the monitor controller may then send the data transmission command to another selected one of the monitors, and so on, until all of the monitors which have indicated with their data ready signals that they have monitoring data ready for transmission have been sent the data transmission command by the monitor controller. In particular, the monitor controller performs this selected transmission of the data transmission command to these "data ready" monitors in a manner which seeks to avoid resource contention in a shared resource between the resulting data transmissions from each of those data ready monitors.

The present techniques recognise that an approach of actively inspecting the monitor controllers to determine when each of them has data ready for transmission represents an undesirable processing burden may itself be the cause of contention in a shared resource such as a communications bus, and furthermore also recognises that disadvantages may arise from an approach in which each monitor is caused simply to send its monitoring data to the monitor controller at predetermined intervals, or when a predetermined number of events has occurred, for example as soon as it is ready to do so, due to the possibility for a shared resource in the data processing system to suffer from resource contention as a result of more than one monitor seeking to perform its data transmission to the monitor controller at the same time. Moreover, the present techniques recognise that such resource contention may also occur when an approach is taken in which the monitor controller broadcasts a command to more than one monitor in the data processing system to transmit its respective monitoring data back to the monitoring controller. Such problems of resource contention, whilst being of lesser significance in a data processing system comprising fewer such monitors, have been identified by the present techniques as contemporary data processing systems involve ever more such monitors. The data processing system itself could take a range of different forms, such as a relatively compact, closely associated system of components such as is represented by a system-on-chip (SOC), through to a much more distributed system, where the components are considerably more physically spread out, as in the example of an "internet of things" (IOT) type system wherein many physically separate lightweight devices are in communication with one another, in particular in the context of the present techniques where many of these components comprise a monitor, which sends its monitoring data back to a centralised monitor controller.

Whilst each monitor may be capable of preparing its monitoring data for transmission to the monitor controller unsolicited, and further to indicate (by means of the data ready signal) to the monitor controller that its monitor data is prepared for transmission, the present techniques recognise that the data ready signals transmitted by each monitor may themselves also represent a possible source of resource contention, for example on a communication bus which connects a plurality of monitors to the monitor controller. Moreover, in order to reduce the activity (and hence possible processing burden and energy expenditure) of each of the plurality of monitors, the present techniques propose that the preparation of data for transmission by each of the plurality of monitors takes place in response to an explicit command to do so from the monitor controller. Accordingly, in some embodiments the monitor controller is capable of transmitting a data preparation command to the plurality of monitors, and the plurality of monitors are each responsive to the data preparation command to initiate preparation of the monitoring data for transmission, and to transmit a data ready signal to the monitor controller when the monitoring data has been prepared for transmission. The preparation of data for transmission may take a variety of forms, but in at least one embodiment this comprises the monitor accessing a counter and turning the count value of that counter into a data packet ready for transmission to the monitor controller.

The monitor controller thus maintains control over when each of the plurality of monitors transmits its monitoring data to the monitor controller (by means of the data transmission command it can send to each of the plurality of monitors) and the present techniques further recognise that the ability of the monitor controller to avoid resource contention is improved where, following the transmission of its own monitoring data to the monitor controller a monitor indicates to the monitor controller that this transmission is complete. Accordingly, in some embodiments the plurality of monitors are each responsive to the data transmission command to transmit the monitoring data ready for transmission to the monitor controller and to transmit a data transmission complete command to the monitor controller when transmission of the monitoring data ready for transmission has been completed.

In such embodiments, where each of the plurality of monitors explicitly identifies when it has completed the transmission of its monitoring data to the monitor controller, it may then simply wait for a further command to be received from the monitor controller without further variation in its own state. However, in some embodiments the plurality of monitors are each responsive to transmission of the data transmission complete command to the monitor controller to enter a low power state. Thus, overall energy consumption of the data processing system can be improved (reduced) by this mechanism of causing each of the plurality of monitors to "sleep", or at least reduce its power consumption, when the requested data transmission to the monitor controller has been carried out.

In response to the reception of a data preparation command from the monitor controller, each of the plurality of monitors may respond in a variety of ways when such monitoring data that should be prepared in response to the data preparation command is, at that moment, not available. For example, in one embodiment the plurality of monitors are each responsive to the data preparation command and a resulting indication that no monitoring data is available for transmission to re-initiate preparation at least once of the monitoring data for transmission. Accordingly, a monitor may try (at least once) to begin preparation of the monitoring data again. Where this retry happens more than once, the monitor may be arranged to initiate it at periodic intervals or at other suitable (perhaps not constant) intervals appropriate to the operation of that monitor.

There may be a variety of reasons why no monitoring data is available when the monitor seeks to prepare monitoring data for transmission to the monitor controller in response to the command to do so, but in some embodiments this may result from a configuration in which the monitoring data for at least one monitor relates to execution of a selected instruction by the data processing system. Accordingly, this monitor may be arranged to monitor instruction execution, for example within a CPU of the data processing system and within an execution pipeline thereof, and in particular to detect when a particular instruction is executed. In such a situation having received the data preparation command from the monitor controller, this monitor may then continue to actively seek to gather monitoring data relating to this instruction, and once such an instruction is executed, to notify this fact to the monitor controller by means of the data ready signal.

A monitor controller may however respond differently to the situation where it is unable to send monitoring data to the monitor controller in response to the data preparation command, in particular because no such monitoring data is currently available for transmission, and in some embodiments the monitor controller is capable of transmitting a data preparation command to the plurality of monitors, and the plurality of monitors are each responsive to the data preparation command to initiate preparation of the monitoring data for transmission, and to transmit a data unavailable signal to the monitor controller when no monitoring data is available for transmission. Thus, when the initiation of preparation of the monitoring data for transmission by a monitor results in an (internal) indication being generated that no data is available, for example because the particular event which this monitor is monitoring has not occurred, then the monitor controller can be made aware of this fact and no explicit data transmission need be made from that monitor to the monitor controller, thus further reducing the possibility for resource contention. The monitor controller can then, as appropriate, choose when to command this monitor to again initiate the preparation of the corresponding monitoring data for transmission.

In some embodiments, the plurality of monitors are each responsive to the data preparation command to exit a low power state. Energy consumption management of the data processing system may thus be improved.

The shared resource in which the monitor controller seeks to avoid resource contention may take a variety of forms. In some embodiments the data processing system comprises a communication bus via which the monitor controller and the plurality of monitors communicate, and wherein the shared resource comprises the communication bus. Accordingly contention between communications between monitors and the monitor controller which might arise is made less likely by the present techniques. Moreover, through this reduction in communication bus contention likelihood, the present techniques enable the communication bus to be provided in a more lightweight manner, for example having a lower bandwidth capability and thus taking up less area in a data processing system (especially such as a SOC) where such area is at a premium.

The communication bus by which the monitor controller and the plurality of monitors communicate may be variously provided, but in some embodiments the data processing system comprises a system bus and wherein the communication bus is a dedicated communication bus for communication between the monitor controller and the plurality of monitors. The provision of a dedicated bus for communication between the monitor controller and plurality of monitors thus enables this communication itself to be separated from communications which take place via the system bus, hence helping to reduce the likelihood of contention on this communication bus. Of course this necessarily requires this communication bus to be provided in addition to the system bus, yet the present techniques (as mentioned above) enable this communication bus be provided in a lightweight manner, without significant increased risk of contention, and efficient communication between the plurality of monitors and the monitor controller is thus supported.

The shared resource may however represent a different component in the data processing system and in some embodiments the monitor controller comprises monitoring data storage to store monitoring data received from the plurality of monitors, and wherein the shared resource comprises the monitoring data storage. Accordingly, the present techniques support usage of such a monitoring data storage, for example with a relatively limited storage capacity, without resource contention arising as a result of monitoring data arriving from more than one monitor.

Such resource contention in a monitoring data storage may be the result of a number of different features of the storage, but in some embodiments the monitoring data storage has capacity to store monitoring data from less than all of the plurality of monitors, and the monitor controller is responsive to available space for storage of monitoring data from at least one monitor to transmit the data transmission command to a selected monitor of the plurality of monitors. Accordingly the present techniques enable this monitoring data storage to be provided as a relatively small component, hence requiring less area of the data processing system to be occupied by this storage capacity, but without contention arising between monitoring data received from more monitors than can be simultaneously stored in the monitoring data storage. The monitor controller can track how much space is currently available for the storage of monitoring data in the monitoring data storage and command the plurality of monitors to transmit their monitoring data (by means of the data transmission command) such that capacity of the monitoring data storage is not exceeded.

The monitoring of this available space may take place in a number of ways, but in some embodiments the monitoring data storage has capacity to store monitoring data from less than all of the plurality of monitors, and the monitor controller is responsive to available space for storage of monitoring data being above a predetermined threshold to transmit the data transmission command to a selected monitor of the plurality of monitors. Accordingly a threshold may be defined (in terms of occupancy of the monitoring data storage and hence available space in the monitoring data storage) which the monitor controller then uses to determine when to send the data transmission command to a next selected monitor of the plurality of monitors which have indicated that they have data ready for transmission (or the last monitor still indicating that it has data ready for transmission, as appropriate).

In some embodiments the monitoring data storage has capacity to store monitoring data from less than all of the plurality of monitors, and the monitor controller is responsive to proximity of a predicted end of data transmission from a first monitor of the plurality of monitors to transmit the data transmission command to a second monitor of the plurality of monitors. Thus, the present techniques recognise that due to some latency associated with the transmission of the data transmission command to a selected monitor of the plurality of monitors and the resulting monitoring data to be transmitted from that monitor back to the monitor controller, a more efficient "pipelined" usage of the monitoring data storage can be supported by the monitor controller sending the data transmission command before reception of the monitoring data from an actively transmitting monitor has completed, when according to known data transmission protocols and sizes it is expected that data transmission from this (first) monitor will soon complete, and therefore by the time a data transmission from the second monitor begins, the likelihood of resource contention within the monitoring data storage is low.

When the monitor controller selects between the more than one monitor which is ready to transmit data to the monitor controller it may do so in a variety of ways, but in some embodiments the monitor controller is responsive to the data ready signals received from the more than one monitor to transmit the data transmission command to the more than one monitor in a predetermined order. This predetermined order may itself be variously defined in accordance with the data processing system requirements, such as the respective priorities of the monitoring data from each of the monitors, the expected size of the monitoring data from each of the monitors, and so on. It could also for example simply be round robin approach.

Rather than using a predetermined order, in some embodiments the monitor controller is responsive to the data ready signals received from the more than one monitor to transmit the data transmission command to the more than one monitor in an order in which the data ready signals have been received from the more than one monitor. Accordingly, the monitor controller can be provided with the ability to keep track of the order in which the data ready signals have been received (for example by using a small FIFO structure) and to then use this to determine the order in which the data transmission command is transmitted to the more than one monitor.

In some embodiments the monitor controller is responsive to the data ready signals received from the more than one monitor to transmit the data transmission command to a selected monitor of the more than one monitor when none of the plurality of monitors are currently transmitting data to the monitor controller. When none of the plurality of monitors are currently transmitting data, and assuming that no other constraints currently exist on the availability of the shared resource, a freely selected monitor can immediately be commanded to transmit.

At least some embodiments provide a method of operating a data processing system comprising gathering monitoring data relating to operation of the data processing system using a plurality of monitors; transmitting data ready signals from more than one monitor of the plurality of monitors to a monitor controller indicating that each has monitoring data ready for transmission to the monitor controller; in response to the data ready signals received from the more than one monitor, selectively transmitting a data transmission command to each of the more than one monitors to avoid resource contention in a shared resource of the data processing system between transmissions from each of the more than one monitors.

At least some embodiments provide a data processing system comprising means for gathering monitoring data relating to operation of the data processing system; and means for transmitting data ready signals from more than one means for gathering monitoring data to means for controlling monitors indicating that each means for gathering monitoring data has monitoring data ready for transmission to the means for controlling monitors, wherein the means for controlling monitors is responsive to the data ready signals received from the more than one means for gathering monitoring data selectively to transmit a data transmission command to each of the more than one means for gathering monitoring data to avoid resource contention in a shared resource of the data processing system between transmissions from each of the more than one means for gathering monitoring data.

At least some embodiments provide a monitor controller to gather monitoring data from a plurality of monitors relating to operation of a data processing system, wherein the monitor controller is responsive to indications received from more than one monitor indicating that each has monitoring data ready for transmission to the monitor controller selectively to transmit a monitoring data transmission command to each of the more than one monitors to avoid resource contention between transmissions from each of the more than one monitors.

Some particular example embodiments are now described with reference to the figures.

FIG. 1 schematically illustrates a data processing system in one embodiment. This data processing system 10 comprises a central processing unit (CPU) 12, a cache 14, an interconnect 16 and a memory management unit (MMU) 18. The data processing system 10 further comprises a memory 20, which is accessed via the main system bus 22. In operation the CPU 12, cache 14, interconnect 16 and MMU 18 perform various data processing functions which are not described in detail here. Note also that these components may each have a connection to the main system bus 22, but, merely for clarity of illustration, these connections are not shown in FIG. 1. Each of these components is provided with a monitor 24, 26, 28 and 30 respectively. Each of these monitoring devices is configured to gather data relating to the operation of the respective component of which it forms part. For example, the CPU 12 comprises an execution pipeline 32 which is provided with an associated counter 34. The counter 34 is arranged to keep track of the number of times that a selected instruction is executed by the pipeline 32. The monitor 24 can access the counter 34 in order to make use of this count value. The cache 14 comprises control circuitry 36, which itself comprises a counter 38, which in the example of FIG. 1 is configured to count the number of times that a cache miss occurs in the cache 14. The monitor 26 can access the control circuitry 36 in order to make use of this count value. The monitor 28 of the interconnect 16 is configured to gather information relating to particular data being transferred by the interconnect 16. For this purpose the interconnect 16 is provided with a data store 39 which stores indications of particular data items which have been transferred via the interconnect 16. The monitor 28 can access this data store 39 in order to determine whether a particular item of data has been transferred via the interconnect 16. The MMU 18 comprises a counter 40, which is arranged to count instances of access to a particular memory address (or set of memory addresses) and the monitor 30 can access the counter 40 in order to make use of this count value. The monitors 24, 26, 28 and 30 communicate with a central monitor controller 42 via a monitoring bus 44. In other words, the monitoring bus is provided for the dedicated purpose of allowing communication between the central monitor controller 42 and the monitors. Each of the monitors 24-30 does not send monitoring data unsolicited to the central monitor controller 42, but rather when it has data which is ready for transmission to the central monitor controller 42 a monitor sends a signal via the monitoring bus 44 indicative of this fact. When the central monitor controller 42 receives such a "data ready" signal from one or more of the monitors 24-30, it selects one of the monitors and sends a command to this monitor indicating that it should transmit its data. The operation of the central monitor controller 42 takes place under control of the control circuitry 44. The central monitor controller 42 does not instruct a monitor to transmit its data as soon as that monitor has indicated that it has data ready for transmission, but rather selects one of the monitors to command to transmit its data so that contention between data transmissions from more than one monitor on the monitoring bus 44 does not occur. Furthermore, the central monitor controller 42 comprises a monitor data buffer 46, which is used to temporarily hold monitor data received from the monitors 24-30. This monitor data buffer 46 necessarily only has limited capacity for data storage and the central monitor controller 42 takes this into account when instructing monitors to transmit their data, so that the capacity of the monitor data buffer 46 is not exceeded. In this sense, both the monitoring bus 44 and the monitor data buffer 46 can be viewed as "resources" which form part of the data processing system, and which the central monitor controller 42 protects in the manner in which it selects a monitor to command to send its data, and with the timing with which it sends such data transmission commands, such that contention in one of these resources does not occur. The central monitor controller 42 gathers data in its monitor data buffer 46 temporarily before sending bursts of data via the main system bus 22 to the memory 20 for more permanent storage. As illustrated by the dashed arrow in FIG. 1, the central monitor controller 42 may also make use of a trace stream generator 48, also forming part of the data processing system, wherein data from the monitor data buffer 46 is transferred to the trace stream generator 48, where it is turned into a trace stream to be output from the data processing system.

Figure 2:
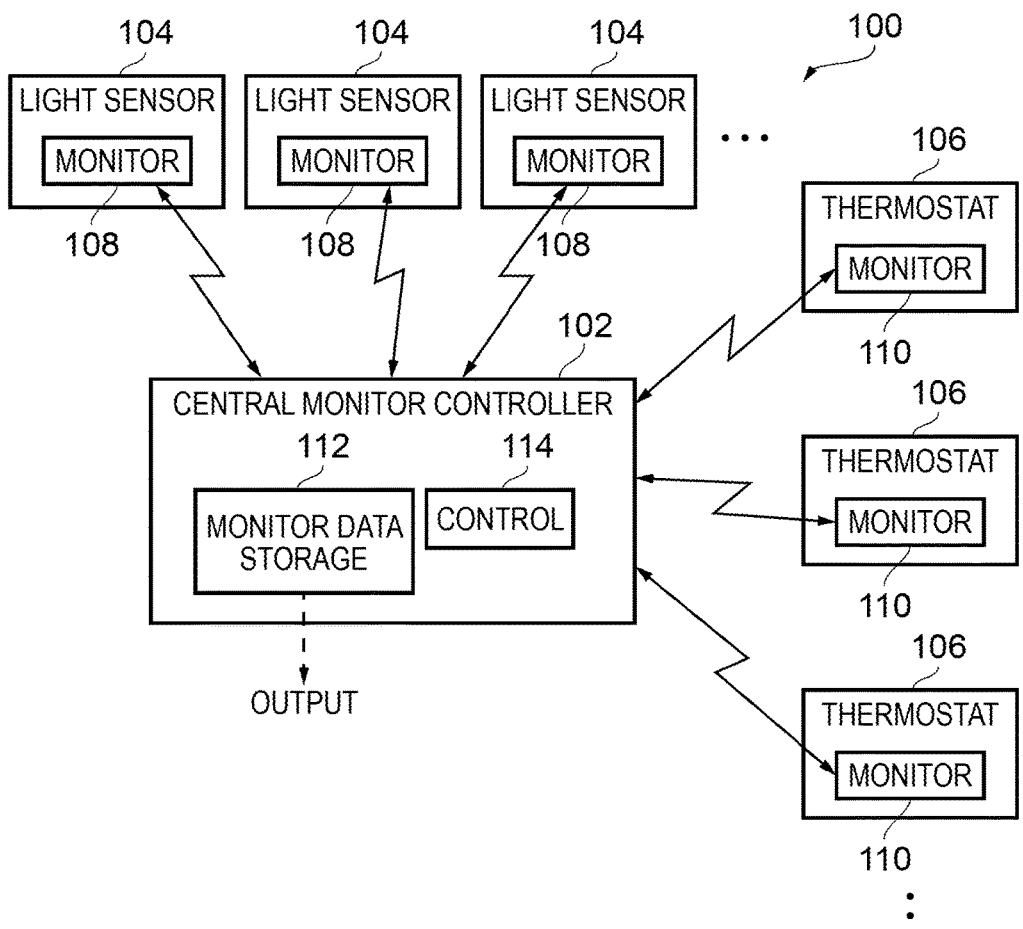
FIG. 2 schematically illustrates a data processing system in another embodiment.

FIG. 2 schematically illustrates a data processing system in another example embodiment. Here the data processing system 100 can be viewed as "an internet of things" (IOT) type system in that the central monitor controller 102 of the data processing system 100 is in communication with a great number of monitors, each forming part of a corresponding component of the data processing system. In the example of FIG. 2 these components are light sensors 104 and the thermostats 106, wherein a great number of these light sensors and thermostats are distributed around a building in order to provide the central monitor controller 102 with information relating to the light and temperature state of many different points within the building. Note that although only three light sensors and thermostats are explicitly illustrated in FIG. 2, the ellipses in FIG. 2 indicate that many more such light sensors and thermostats are in fact in communication with the central monitor controller 102 (these having been omitted for clarity of illustration only). Each of the monitors 108 of the light sensors 104 and the monitors 110 of the thermostats 106 is arranged to communicate wirelessly with the central monitor controller 102. As in the case of the central monitor controller of FIG. 1, the central monitor controller 102 comprises monitor data storage 112 and control circuitry 114. Further, also in a similar manner to that described above with reference to FIG. 1, central manager controller 102 operates under control of the control circuitry 114 to instruct a selected one of the monitors 108, 110 to transmit its data (when the corresponding monitor has indicated that it has monitored data ready for transmission) so as to avoid resource contention within the system 100. This may for example involve limiting the frequency with which monitors can wirelessly transmit their data to the central monitor controller in order to avoid contention in the wireless resource which provides the communication medium between the monitors 108, 110 and the central monitor controller 102, and/or may involve limiting the frequency with which monitors may transmit their data such that the capacity of the monitor data storage 112 is not exceeded. The monitor data storage 112 temporarily holds monitoring data gathered from one or more of the monitors 108, 110 before this is then output for further analysis by a user.

Figure 3:
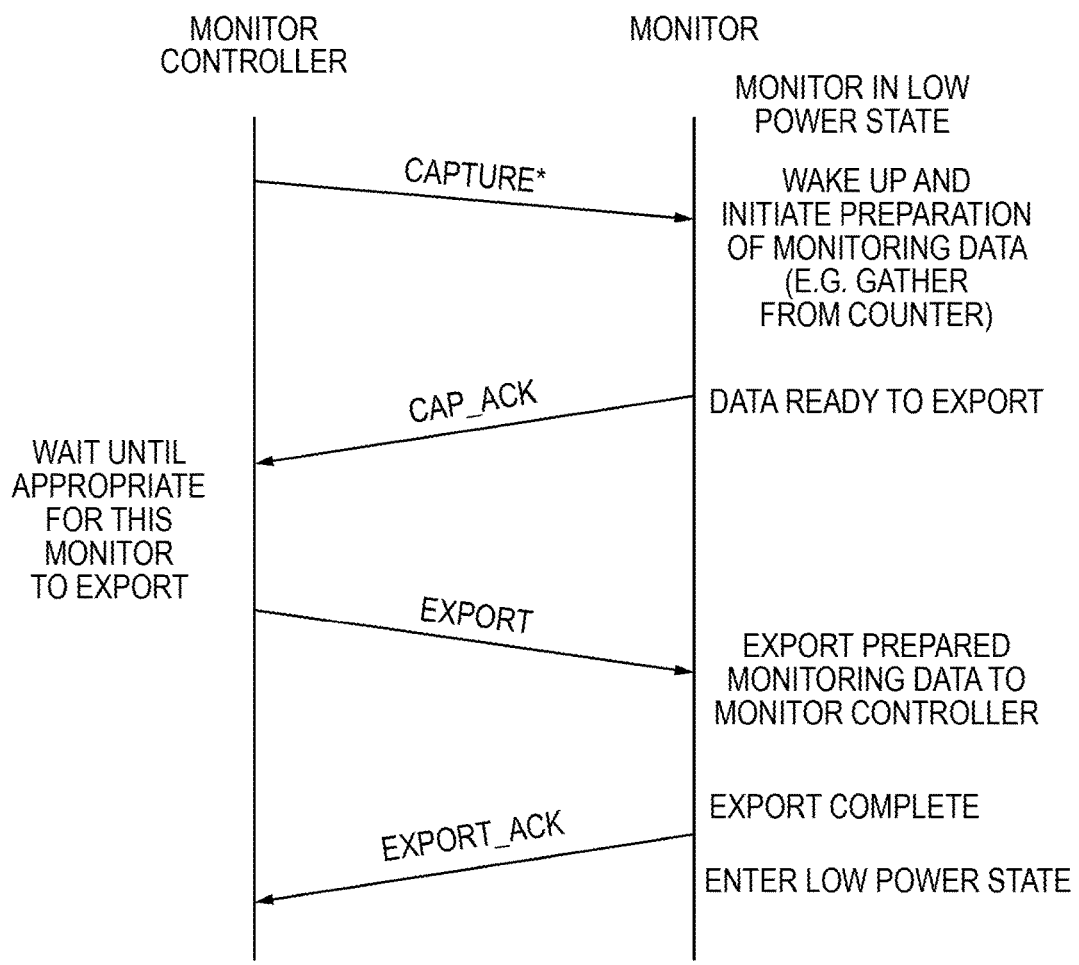
FIG. 3 shows a signalling diagram representing communication between a monitor controller and a single monitor (of a plurality of monitors in a data processing system) in one embodiment.

FIG. 3 illustrates a sequence of signal exchanges between a monitor controller and a monitor in one embodiment. Initially the monitor is in a low power state and not actively performing any kind of data processing. When the monitor controller wishes to gather information relating to the component of the system of which the monitor forms part it first sends a "capture" signal to this monitor. Note, as illustrated in the figure, this CAPTURE command may also be broadcast to other monitors within the system, indeed may be broadcast all monitors within the system. In response, a monitor which receives this command exits its low power state and initiates preparation of monitoring data for transmission back to the monitor controller. For example, this may comprise accessing a counter to which the monitor has access within the component in order to make use of the counter value. Once this has been done and the monitoring data is ready to be "exported" i.e. sent back to the monitor controller the monitor transmits a "capture acknowledge" CAP_ACK signal to the monitor controller. In other words this is a "data ready" signal, indicating that the required data has been captured (and is ready for export). On receipt of this signal the monitor controller may immediately respond by telling the monitor to export its data, however, the monitor controller (as mentioned above) is in particular arranged to make sure that resource contention does not occur within a shared resource in the system in which the monitor controller and monitor(s) are found and as such the monitor controller may wait until it is appropriate (as discussed in more detail elsewhere herein) for this monitor to export its data before commanding it to do so. Once this point has been reached then the monitor controller transmits the EXPORT command to the monitor and in response the monitor begins transmission of its monitoring data back to the monitor controller. Once this export is complete the monitor indicates this fact to the monitor controller by means of the EXPORT_ACK signal and re-enters its low power state. If other monitors have data pending transmission to the monitor controller (indicated by means of the CAP_ACK signal), then the monitor controller can then select one of them and send it the EXPORT command (assuming that the monitor controller judges that this will not result in resource contention).

Figure 4:
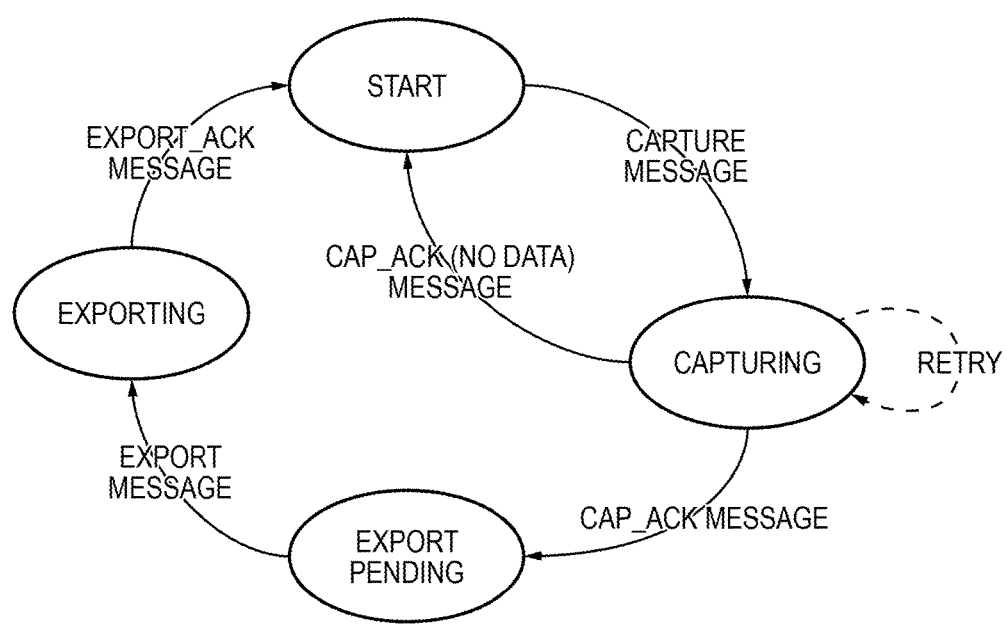
FIG. 4 is state diagram representing four states in which a monitor in the data processing system of one embodiment may operate and the transitions between those states.

FIG. 4 shows a state diagram illustrating the four possible states in one embodiment in which a monitor in the data processing system may exist, with the movement between these possible states being dependent upon different messages exchanged between the monitor controller and the monitor. A monitor can be considered to begin in the START state shown at the top of FIG. 4 (which may also be a low power state as mentioned above with respect to FIG. 3). Receipt of the CAPTURE message from the monitor controller causes the monitor to transition to its CAPTURING state in which it seeks to gather and prepare the required monitoring data for transmission back to the monitor controller. Three possible movements from this CAPTURING state are shown in FIG. 4. Firstly, if the preparation of the monitoring data for transmission is successful, once this monitoring data has been prepared the monitor transmits the CAP_ACK message to the monitor controller and thus moves to the EXPORT PENDING state. Secondly, if the monitor finds that there is no suitable data available for transmission to the monitor controller, for example because an event to which that monitoring data pertains has not occurred, then it can indicate this fact to the monitor controller by means of the CAP_ACK (NO DATA) message sent to the monitor controller and thereby transition itself back to the START state. Alternatively, and thirdly, as shown by the dashed line in FIG. 4, if the monitor finds that the requested monitoring data is not available for transmission to the monitor controller it may retry gathering this monitoring data and thus remain in the CAPTURING state. This retry may for example only take place a limited number of times (perhaps even only once) or may for example be repeated periodically until successful. Such a retry procedure may be used in the example of a monitor 24 such as that shown in FIG. 1 within the CPU 12 which seeks to gather information relating to a particular instruction being executed by the execution pipeline 32, and by entering the illustrated retry loop may remain active, monitoring for execution of this particular instruction, and ultimately send the CAP_ACK message to the monitor controller once this instruction has been executed. From the EXPORT PENDING state the monitor waits until it is instructed by the monitor controller to transmit its monitoring data, this being commanded by the monitor controller by means of the EXPORT message and on receipt of this message the monitor transitions to its EXPORTING state in which it transmits the monitoring data to the monitor controller. Once this transmission (exporting) of the monitoring data has been completed the monitor indicates this to the monitor controller by means of the EXPORT_ACK message and transitions back to its START state.

Figure 5:
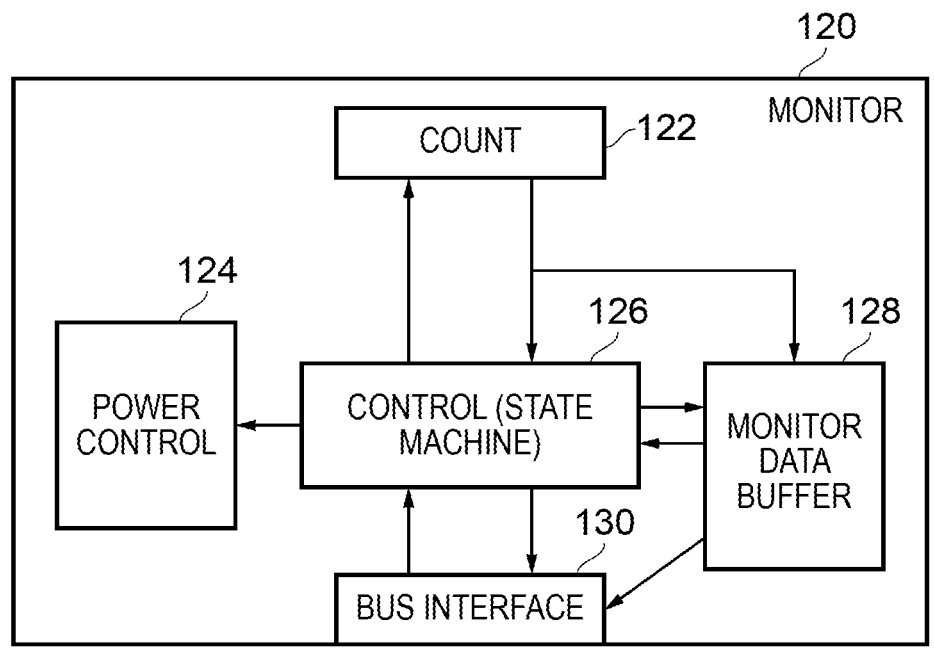
FIG. 5 schematically illustrates a monitor in one embodiment.

FIG. 5 schematically illustrates in more detail the configuration of a monitor in one embodiment. Here the monitor 120 comprises a counter 122, power control circuitry 124, control circuitry 126, a monitor data buffer 128 and a bus interface 130. As indicated in the figure, the control circuitry 126 also can be considered as a state machine, and in this example this constrains the monitor 120 to behave in accordance with the state diagram illustrated in FIG. 4. Access from the control circuitry 126 to the power control circuitry 124 enables the control circuitry to wake up the monitor 120 when exiting the START state and to enter a lower power state when transitioning to the START state. Communication between the monitor 120 and a monitor controller takes place via the bus interface 130, which enables the monitor 120 to interact with the bus which connects to the two together, for example in the form of the monitoring bus 44 shown in FIG. 1. On receipt of the CAPTURE message from a monitor controller the control circuitry 126 accesses the counter 122 in order to make use of the current count value held herein. This value is temporarily stored in the monitor buffer 128 and from there, once the monitor 120 receives the EXPORT message, the control circuitry 126 causes the count value (as part of a suitably prepared data packet) to be transmitted via the bus interface 130 to the monitor controller. The counter 122 is also directly connected to the control circuitry 126, such that in the event that no count data is currently available for transmission to the monitor controller, for example because the counter 122 has yet (since being reset) to see a corresponding event, the control circuitry 126 can take appropriate action (as discussed above with respect to the possible options in the event of no suitable data being available for transmission when in the CAPTURING state shown in FIG. 4).

Figure 6:
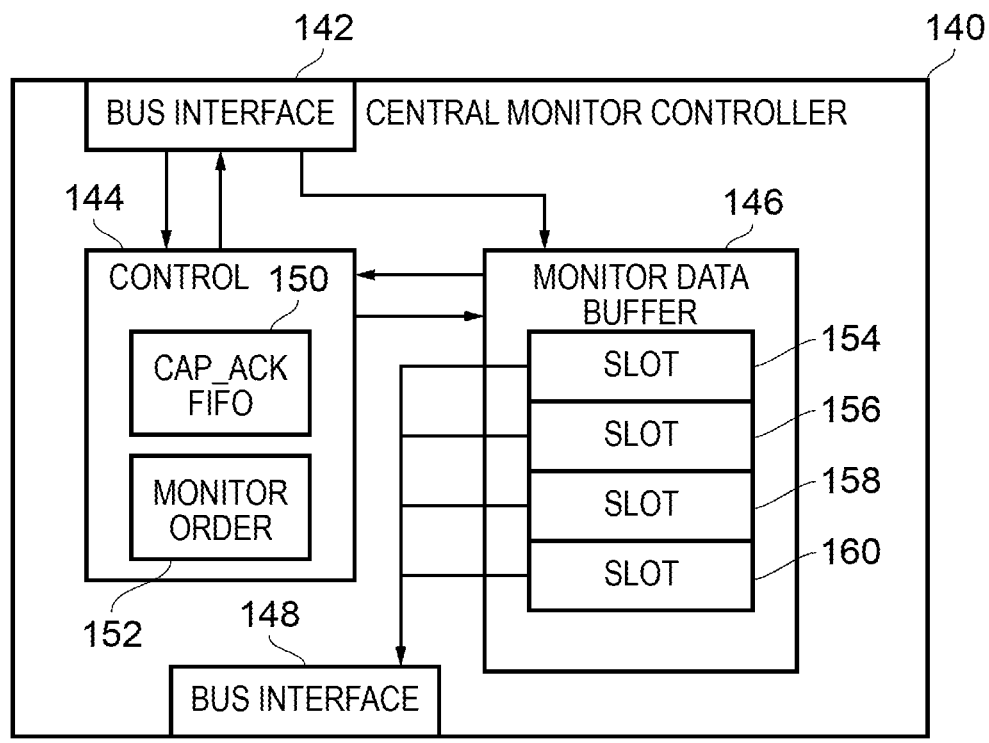
FIG. 6 schematically illustrates a monitor controller in one embodiment.

FIG. 6 schematically illustrates in more detail the configuration of a central monitor controller, such as central monitor controller 42 shown in FIG. 1 in one embodiment. The central monitor controller 140 comprises a bus interface 142, control circuitry 144, a monitor data buffer 146 and a further bus interface 148. Overall control of the central monitor controller 140 is maintained by the control circuitry 144. Moreover, the control circuitry 144 is responsible for communication with each of the monitors in the data processing system via the bus interface 142. After the control circuitry 144 has sent the CAPTURE message to one or more of the monitors in the data processing system, the control circuitry 144 makes use of the CAP_ACK FIFO 150, which forms part of the control circuitry 144, in order to keep track of the order in which the monitors respond to the CAPTURE message with their respective CAP_ACK messages. This is done so that the control circuitry 144 can then command the monitors to export their data in the order in which those CAP_ACK messages were received from the monitors. However, this is not the only ordering in which the control circuitry 144 can cause the monitors to export. The control circuitry 144 is further provided with monitor order storage 152 which provides a predetermined ordering of the monitors which (when configured to do so) the control circuitry 144 can use to select the order in which the monitors should export. This could be a simple round robin ordering (e.g. numerical label sequential), but in this example ranks the monitors in terms of priorities of their respective monitoring data. Monitoring data received from the monitors via the bus interface 142 is temporarily held in the monitor data buffer 146, which comprises four slots 154-160. Each of the slots 154-160 can hold a "standard" package of monitoring data from each monitor, where in this illustrated embodiment the size of data from each monitor is expected to be similar or indeed the same. The control circuitry 144 tracks the occupancy of the slots 154-160 within the monitor data buffer 146 and will only instruct a monitor to export its data when there is capacity within the monitor data buffer for this data to be received. In other words, a threshold of these occupied slots is defined and the monitor controller 140 will generally only send an EXPORT command when this number or fewer slots are occupied. However, the control circuitry 144 can also be arranged to take the data transmission latency within the system into account when monitoring the occupancy of the monitor data buffer 146 and accordingly, may send an EXPORT command to one of the monitors before space for the expected data is actually available within the monitor data buffer 146, if the monitor data buffer is currently in the processes of transferring data out of at least one of the slots 154-160 via the bus interface 148, and known data transfer times indicate that by the time the monitor responds to the EXPORT command by transmitting its data, and that data arrives at the central monitor controller 140, this slot is expected to be available.

Figure 7:
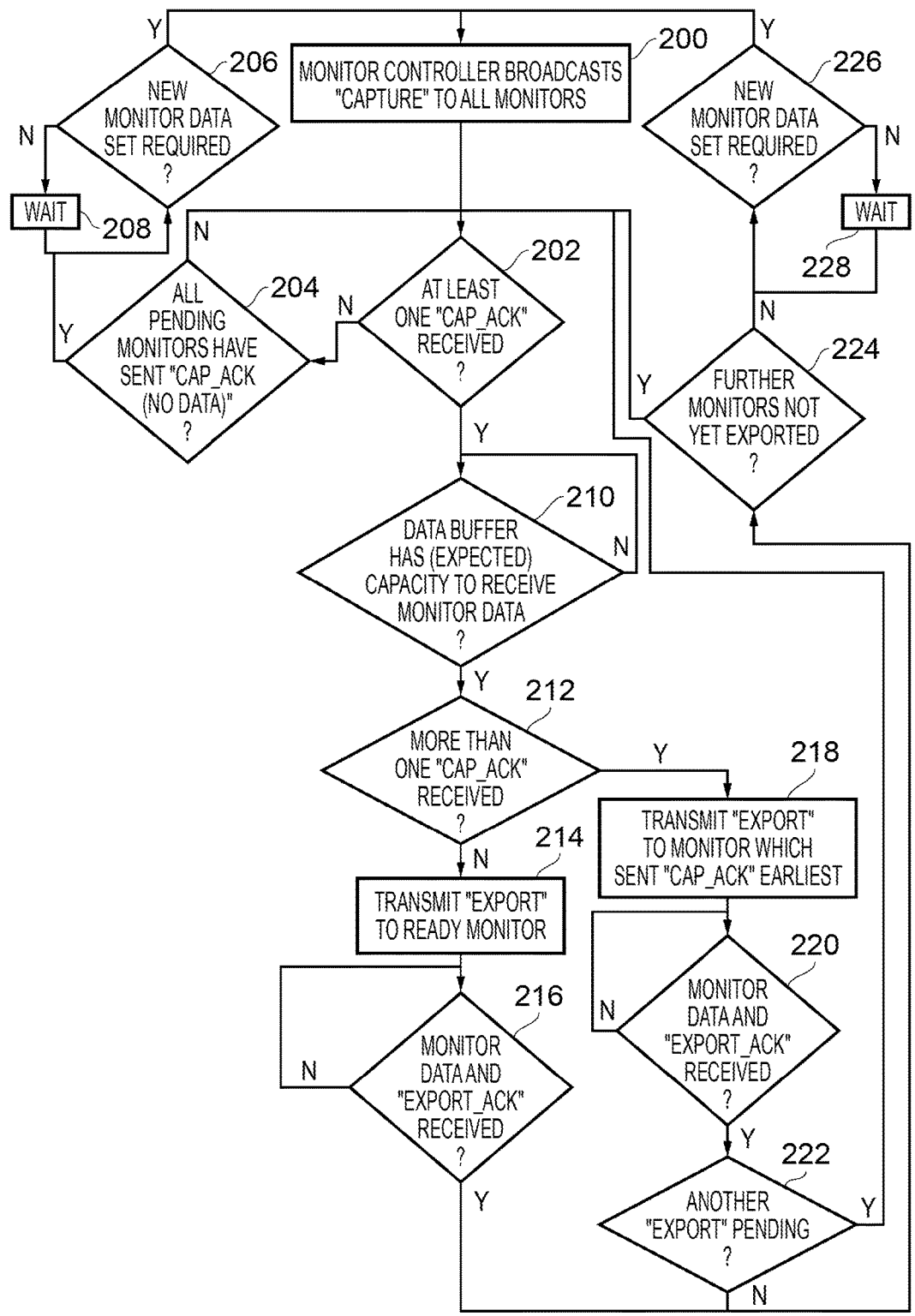
FIG. 7 shows a sequence of steps which are carried out in the monitor controller of one embodiment.

FIG. 7 shows a sequence of steps which are taken according to the method of one embodiment when operating a monitor controller within a data processing system. The flow can be considered to begin at step 200 where the monitor controller broadcasts the CAPTURE command to all monitors within the data processing system. The flow then proceeds to step 202, where it is determined if the monitor has received at least one CAP_ACK response from a monitor. If it has not then the flow moves to step 204 where it is determined if all pending monitors have sent the CAP_ACK (NO DATA) message. If this is not the case then the flow returns to step 202, i.e. the monitor waits until at least one variety of CAP_ACK response is received. If however at step 204 it is determined that all pending monitors have indeed sent the CAP_ACK (NO DATA) message, then the flow proceeds to step 206, since a response to the CAPTURE command has been received from all monitors and it is then determined if new monitoring data is required from the monitors in the data processing system. If it is not then, with a suitable wait at step 208, the flow remains here (i.e. at steps 206 and 208) until a new set of monitor data is required. Returning to a consideration of step 202, when at least one CAP_ACK command is received the flow proceeds to step 210 where the monitor controller determines if its data buffer currently has the capacity to receive further monitor data. Note also that as indicated this could be the expected capacity (by the time that data arrives) as mentioned above. If it does not then the flow waits at this step until such capacity is available. Once this capacity within the data buffer is available then the flow proceeds to step 212 where it is determined if only one CAP_ACK response has been received (and is still pending a response by the monitor controller) or if more than one such message has been received (and each is still pending a response). If only one CAP_ACK message has been received then the flow proceeds to step 214 where the monitor controller transmits the EXPORT signal to that ready monitor. Then the flow waits at step 216 until the monitor data and the corresponding transmission completion message EXPORT_ACK has been received. Once this is the case the flow continues to step 224. Alternatively, if at step 212 it is determined that more than one CAP_ACK response has been received (and are still pending a response) then the flow proceeds to step 218 where the monitor controller transmits the EXPORT command to the monitor which sent its CAP_ACK response the earliest. The flow then waits at step 220 until the corresponding monitoring data and EXPORT_ACK transmission completion message has been received from this monitor. When it is then it is determined at step 222 if another export is pending i.e. for another monitor which has transmitted its CAP_ACK message. If another such export is still pending then the flow returns to step 202. If no such other export is pending then the flow proceeds to step 224. At step 224 it is determined if there are any monitors which have not yet exported data (including possibly responding with the CAP_ACK (NO DATA) message) in response to the broadcast CAPTURE message. If there are further monitors from which monitoring data should be received then the flow returns to step 202. Once all monitors have responded (and if necessary have exported their data) then the flow continues to steps 226 and 228 where, like step 206 and 208, the flow waits until a new monitor data set is required and then the flow begins again at step 200.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing system comprising:
   a monitor controller; and
   a plurality of monitors to gather monitoring data relating to operation of the data processing system;
   wherein the monitor controller is capable of transmitting a data preparation command to the plurality of monitors, and the plurality of monitors are each responsive to the data preparation command to initiate preparation of the monitoring data for transmission, and to transmit a data ready signal to the monitor controller when the monitoring data has been prepared for transmission; and
   wherein the monitor controller is responsive to data ready signals received from more than one monitor indicating that each has monitoring data ready for transmission to the monitor controller selectively to transmit a data transmission command to each of the more than one monitors to avoid resource contention in a shared resource between transmissions from each of the more than one monitors.

2. The data processing system of claim 1, wherein the plurality of monitors are each responsive to the data transmission command to transmit the monitoring data ready for transmission to the monitor controller and to transmit a data transmission complete command to the monitor controller when transmission of the monitoring data ready for transmission has been completed.

3. The data processing system of claim 2, wherein the plurality of monitors are each responsive to transmission of the data transmission complete command to the monitor controller to enter a low power state.

4. The data processing system of claim 1, wherein the plurality of monitors are each responsive to the data preparation command and a resulting indication that no monitoring data is available for transmission to re-initiate preparation at least once of the monitoring data for transmission.

5. The data processing system of claim 4, where the monitoring data for at least one monitor relates to execution of a selected instruction by the data processing system.

6. The data processing system of claim 1, wherein the plurality of monitors are each responsive to the data preparation command to transmit a data unavailable signal to the monitor controller when no monitoring data is available for transmission.

7. The data processing system of claim 1, wherein the plurality of monitors are each responsive to the data preparation command to exit a low power state.

8. The data processing system of claim 1, further comprising a communication bus via which the monitor controller and the plurality of monitors communicate, and wherein the shared resource comprises the communication bus.

9. The data processing system of claim 8, further comprising a system bus and wherein the communication bus is a dedicated communication bus for communication between the monitor controller and the plurality of monitors.

10. The data processing system of claim 1, wherein the monitor controller comprises monitoring data storage to store monitoring data received from the plurality of monitors, and wherein the shared resource comprises the monitoring data storage.

11. The data processing system of claim 10, wherein the monitoring data storage has capacity to store monitoring data from less than all of the plurality of monitors, and the monitor controller is responsive to available space for storage of monitoring data from at least one monitor to transmit the data transmission command to a selected monitor of the plurality of monitors.

12. The data processing system of claim 10, wherein the monitoring data storage has capacity to store monitoring data from less than all of the plurality of monitors, and the monitor controller is responsive to available space for storage of monitoring data being above a predetermined threshold to transmit the data transmission command to a selected monitor of the plurality of monitors.

13. The data processing system of claim 10, wherein the monitoring data storage has capacity to store monitoring data from less than all of the plurality of monitors, and the monitor controller is responsive to proximity of a predicted end of data transmission from a first monitor of the plurality of monitors to transmit the data transmission command to a second monitor of the plurality of monitors.

14. The data processing system of any of claim 1, wherein the monitor controller is responsive to the data ready signals received from the more than one monitor to transmit the data transmission command to the more than one monitor in a predetermined order.

15. The data processing system of claim 1, wherein the monitor controller is responsive to the data ready signals received from the more than one monitor to transmit the data transmission command to the more than one monitor in an order in which the data ready signals have been received from the more than one monitor.

16. The data processing system of claim 1, wherein the monitor controller is responsive to the data ready signals received from the more than one monitor to transmit the data transmission command to a selected monitor of the more than one monitor when none of the plurality of monitors are currently transmitting data to the monitor controller.

17. A method of operating a data processing system comprising:
   gathering monitoring data relating to operation of the data processing system using a plurality of monitors;
   transmitting a data preparation command to the plurality of monitors, and the plurality of monitors are each responsive to the data preparation command to initiate preparation of the monitoring data for transmission, and to transmit a data ready signal to the monitor controller when the monitoring data has been prepared for transmission;
   transmitting data ready signals from more than one monitor of the plurality of monitors to a monitor controller indicating that each has monitoring data ready for transmission to the monitor controller; and
   in response to the data ready signals received from the more than one monitor, selectively transmitting a data transmission command to each of the more than one monitors to avoid resource contention in a shared resource of the data processing system between transmissions from each of the more than one monitors.

18. A data processing system comprising:
   means for gathering monitoring data relating to operation of the data processing system; and
   means for transmitting data ready signals from more than one means for gathering monitoring data to means for controlling monitors indicating that each means for gathering monitoring data has monitoring data ready for transmission to the means for controlling monitors;
   wherein the means for controlling monitors is capable of transmitting a data preparation command to the more than one means for gathering monitoring data, and the more than one means for gathering monitoring data are each responsive to the data preparation command to initiate preparation of the monitoring data for transmission, and to transmit a data ready signal to the means for gathering monitoring data when the monitoring data has been prepared for transmission; and
   wherein the means for controlling monitors is responsive to the data ready signals received from the more than one means for gathering monitoring data selectively to transmit a data transmission command to each of the more than one means for gathering monitoring data to avoid resource contention in a shared resource of the data processing system between transmissions from each of the more than one means for gathering monitoring data.

19. A monitor controller to gather data from a plurality of monitors relating to operation of a data processing system, the monitoring controller comprising
   a transmitter capable of transmitting a data preparation command to the plurality of monitors to cause preparation of the monitoring data for transmission;
   a receiver capable of receiving a data ready signal when the plurality of monitors have prepared the monitoring data for transmission; and
   control circuitry, responsive to indications received by the receiver from more than one monitor controller, to selectively transmit via the transmitter a monitoring data transmission command to each of the more than one monitors to avoid resource contention between transmissions from each of the one or more monitors.

* * * * *